Jan. 15, 1924.
M. VIDAVER
1,480,845
FILM TESTING INSTRUMENT
Filed Dec. 19, 1921
8 Sheets-Sheet 2
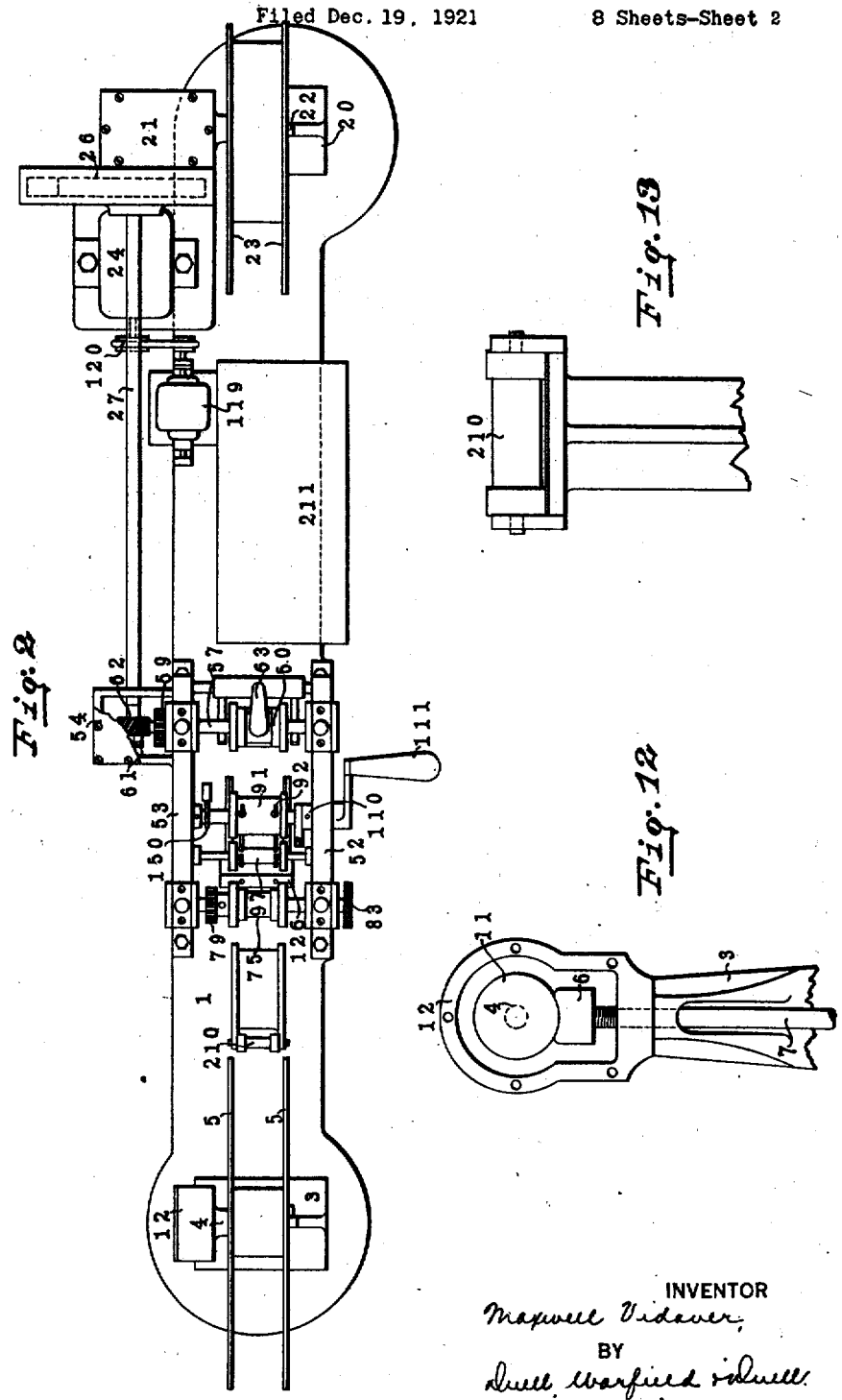
INVENTOR
Maxwell Vidaver,
BY
Duell, Warfield & Duell.
ATTORNEY

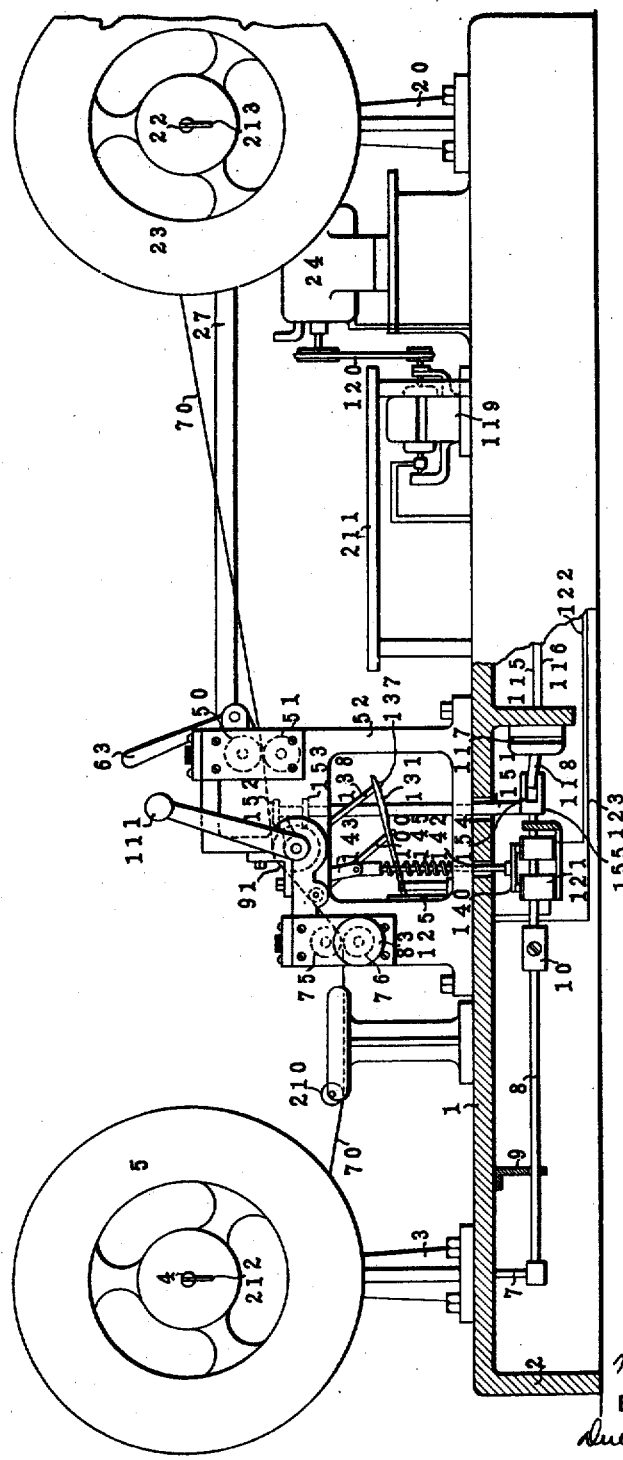

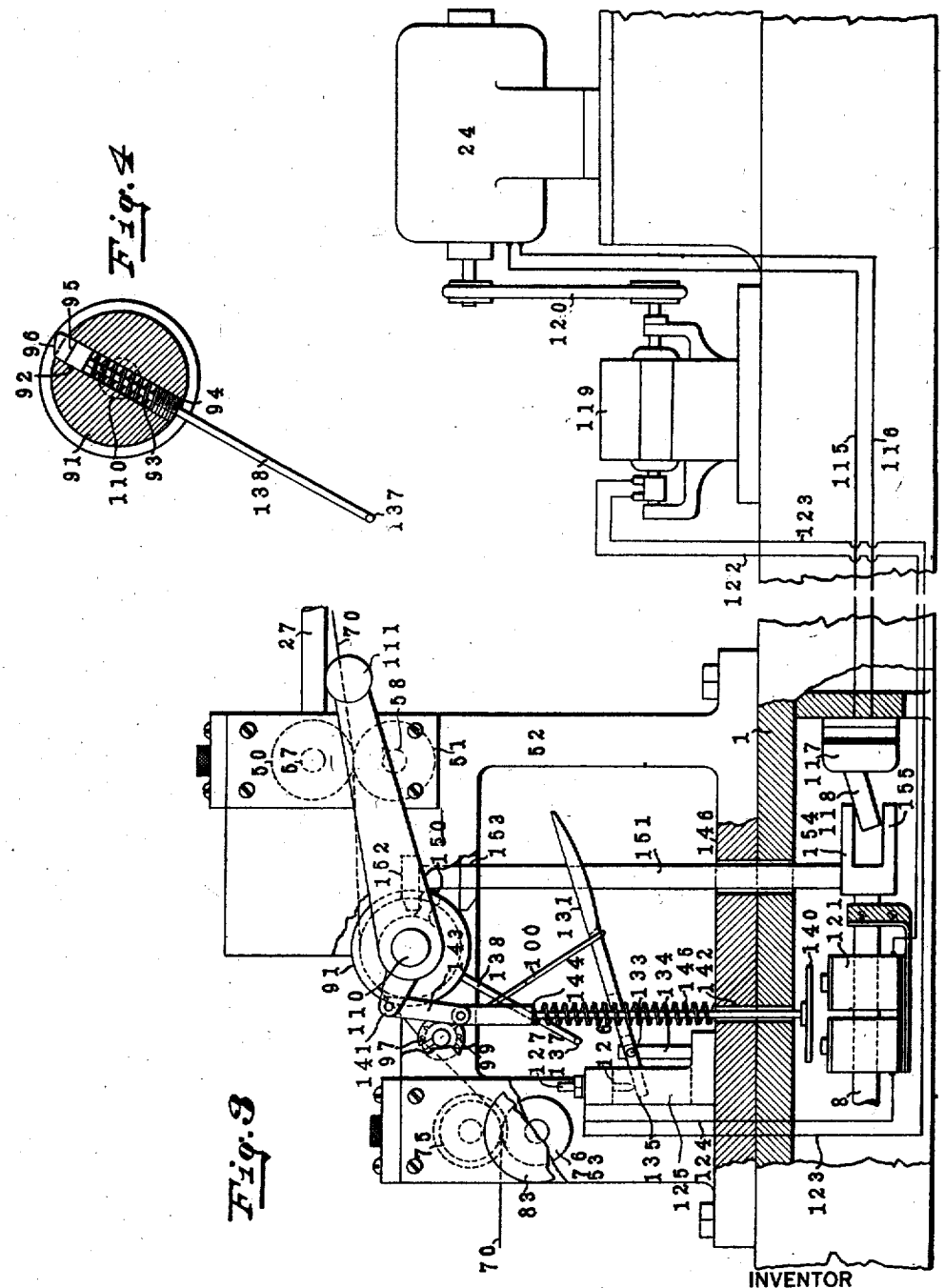

Jan. 15, 1924.

M. VIDAVER 1,480,845

FILM TESTING INSTRUMENT

Filed Dec. 19, 1921

INVENTOR
Maxwell Vidaver
BY
Duell, Warfield & Duell.
ATTORNEY

Jan. 15, 1924.
M. VIDAVER
1,480,845
FILM TESTING INSTRUMENT
Filed Dec. 19, 1921
8 Sheets-Sheet 5
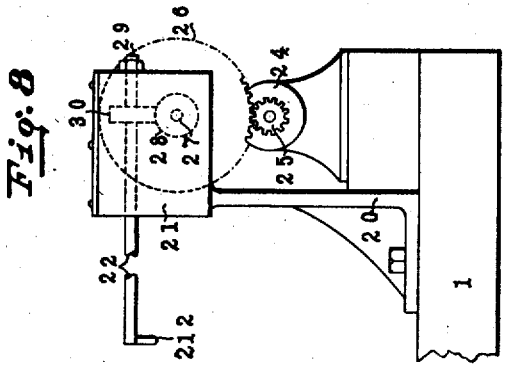
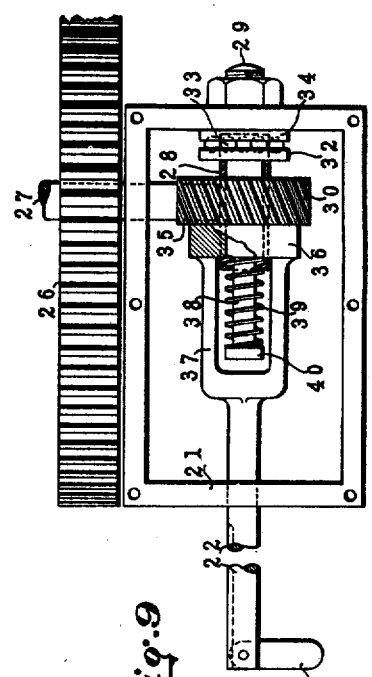
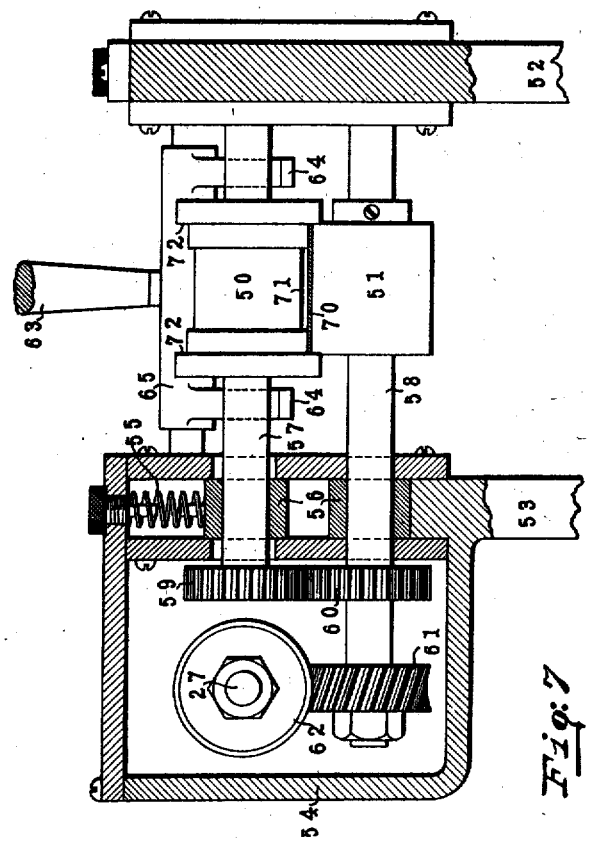
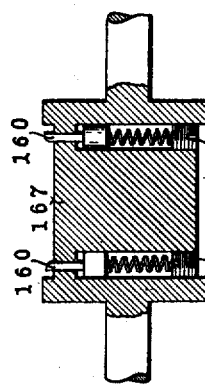
INVENTOR
Maxwell Vidaver
BY
Duell, Warfield &
ATTORNEY

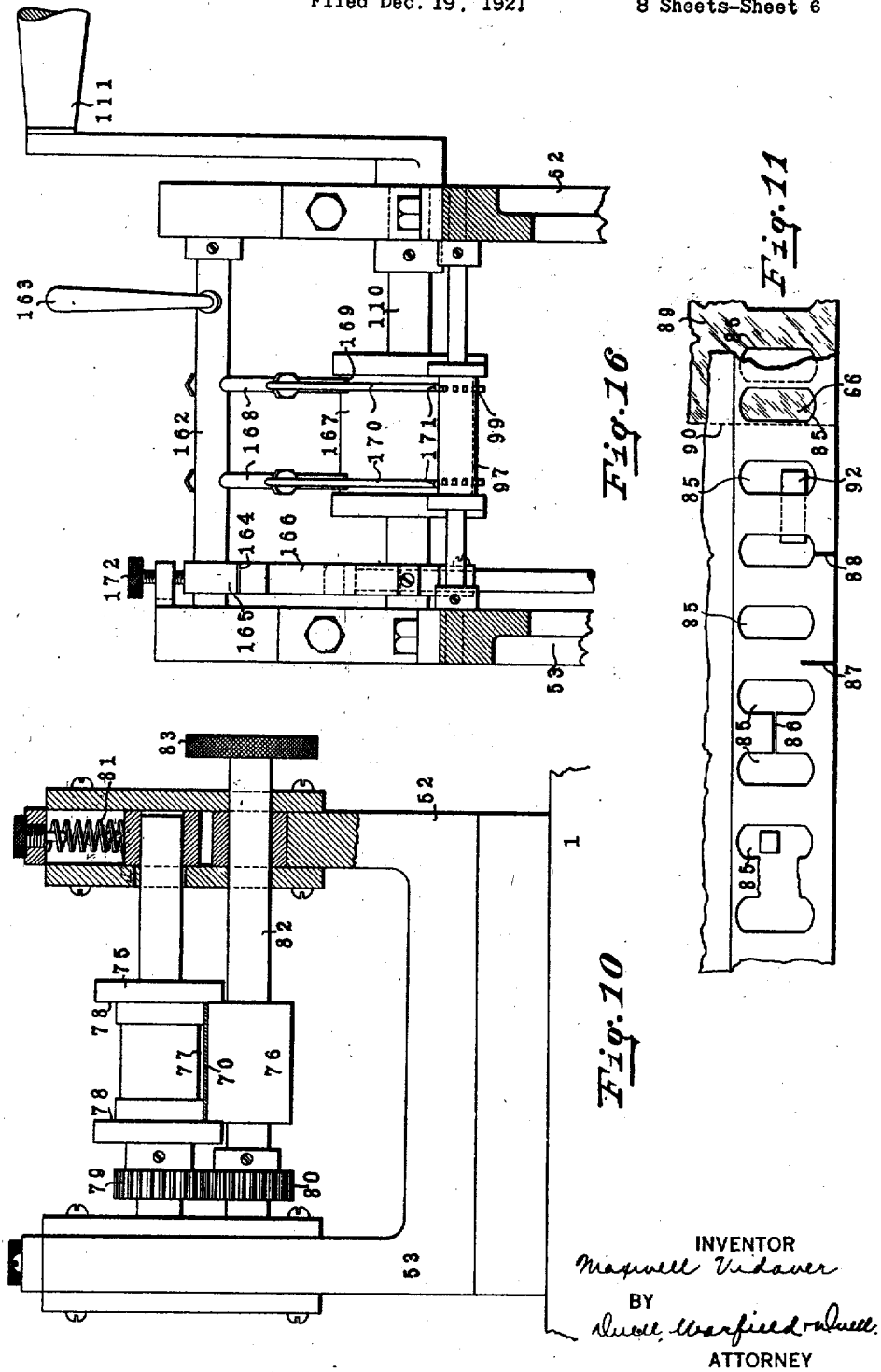

Jan. 15, 1924.
M. VIDAVER
1,480,845
FILM TESTING INSTRUMENT
Filed Dec. 19, 1921
8 Sheets—Sheet 7
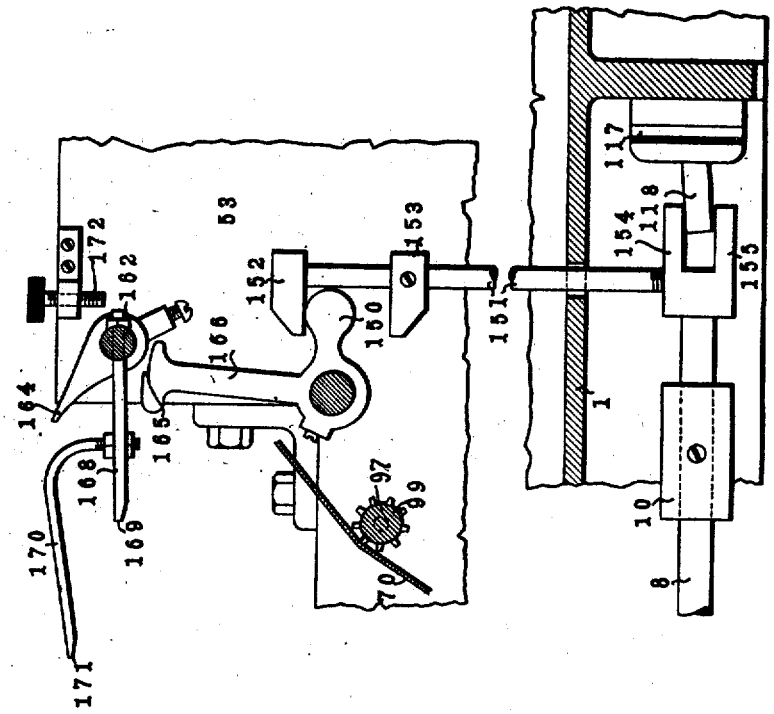
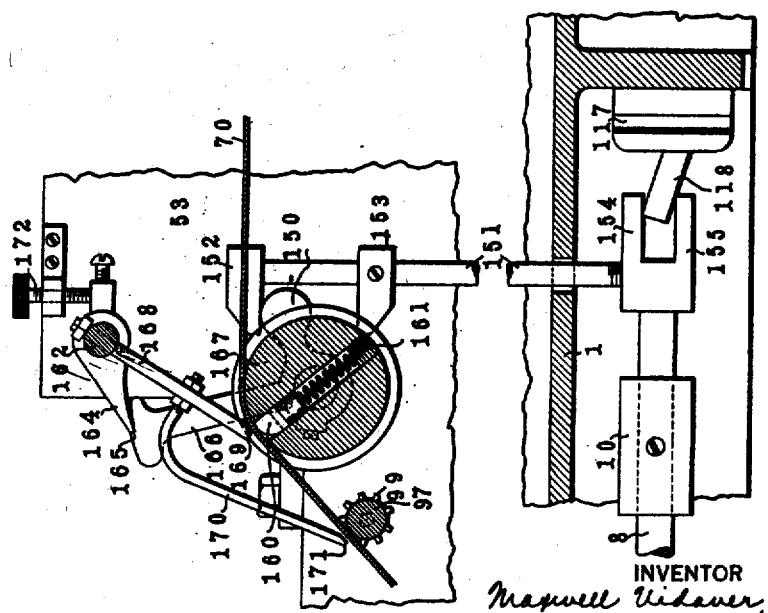
INVENTOR
Maxwell Vidaver,
BY
Duell, Warfield & Duell.
ATTORNEY

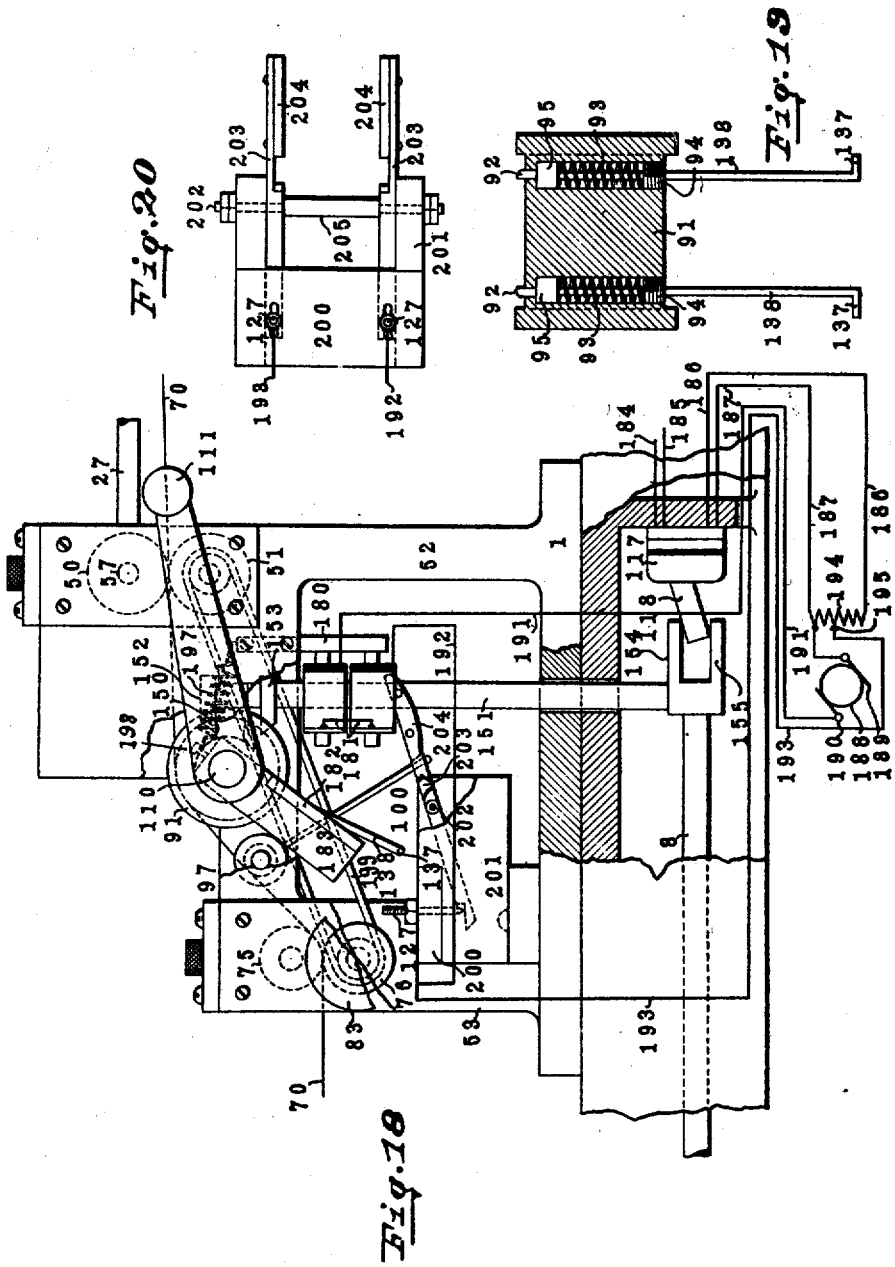

Patented Jan. 15, 1924.

UNITED STATES PATENT OFFICE.

MAXWELL VIDAVER, OF NEW YORK, N. Y., ASSIGNOR TO FILM INSPECTION MACHINE COMPANY, INC., OF NEW YORK, N. Y., A CORPORATION OF DELAWARE.

FILM-TESTING INSTRUMENT.

Application filed December 19, 1921. Serial No. 523,256.

*To all whom it may concern:*

Be it known that I, MAXWELL VIDAVER, a citizen of the United States, residing at New York, in the county of New York and State of New York, have invented certain new and useful Improvements in Film-Testing Instruments, of which the following is a full, clear, and exact description, such as will enable others skilled in the art to which it appertains to make and use the same.

This invention relates to instruments for testing material and with respect to its more specific features to instruments of the character referred to for testing a flexible strip to ascertain the presence of defects, as for instance, abnormally located apertures, slits and the like and the presence of abnormally located strip material taking the place of normal apertures. The embodiment of the invention herein disclosed is specially adapted for testing transparent moving picture strip popularly called "film".

One of the objects of the invention is the provision of a practical testing instrument, or machine, of the kind referred to, delicately responsive to various different kinds of defects in the strip, especially in such a strip as a so-called "film" utilized in taking and projecting moving pictures; and especially to detect the absence of material in the strip where there should be material and to detect the presence of material in the strip where there should be no material.

Another object of the invention is the provision of a simple construction to effect detection without injury to the strip and without intensifying the defects which may be present in the strip.

Another object of the invention is the provision of a practically operative instrument of the character referred to which will perform the testing operations rapidly and without scratching or otherwise marring the picture surface or the pictures and without removing the coating of the strip.

Another object of the invention is the provision of a machine, of the character referred to, fully automatic in operation and which may be readily loaded and unloaded with the strip material.

Another object of the invention is the provision of an automatically operating machine of the character referred to in which the actuation of the controlling devices may be effected in a strong and positive manner notwithstanding the delicacy of the operation of detection, and the possible lightness of construction and rapidity of movement of some of the features directly co-operating to test the strip.

Other objects will be in part obvious and in part pointed out hereinafter.

The invention accordingly consists in the features of construction, combinations of elements and arangement of parts which will be exemplified in the construction hereinafter set forth, and the scope of the application of which will be indicated in the following claims.

In the accompanying drawings, forming part of this specification wherein similar reference characters refer to similar parts throughout the several views, Figure 1 is a side elevation, partly in section, illustrating one embodiment of the invention;

Fig. 2 is a plan view of Fig. 1, with the strip omitted;

Fig. 3 is a side elevation, partly sectional, of the feature detectors and part of the feed controlling mechanism;

Fig. 4 is a sectional detail of one form of feature detector;

Fig. 7 is an end elevation of the strip feeding rolls, some of the driving mechanism for these rolls being shown in the sectional portion of the view;

Fig. 8 is a side elevation, showing some of the operative connections between the driving motor and the strip take-up device;

Fig. 9 is a detail illustrating a portion of the driving connections between the motor and the strip take-up device;

Fig. 10 is an end elevation, partly sectional, of the guiding and tensioning rolls;

Fig. 11 is a diagrammatic plan view of a portion of the strip to be tested, associated with feature detectors;

Fig. 12 is a detail of the brake for the strip-supply device;

Fig. 13 illustrates an end view of a detail of Fig. 1;

Fig. 14 is a longitudinal sectional elevation of a modified form of feature detector and certain parts cooperative therewith;

Fig. 15 is a sectional elevation showing some of the parts of Fig. 14 in a different position;

Fig. 16 is an end elevation of some of the parts of Fig. 14;

Fig. 17 is a transverse sectional detail showing the aperture feature detectors of Fig. 14;

Fig. 18 is a side elevation, partly sectional, of a somewhat different arrangement of the controlling devices from that illustrated in Fig. 3;

Fig. 19 is a transverse sectional detail showing the aperture feature detectors of Figs. 3 and 18; and Fig. 20 is a detail of Fig. 18.

Figure 6:
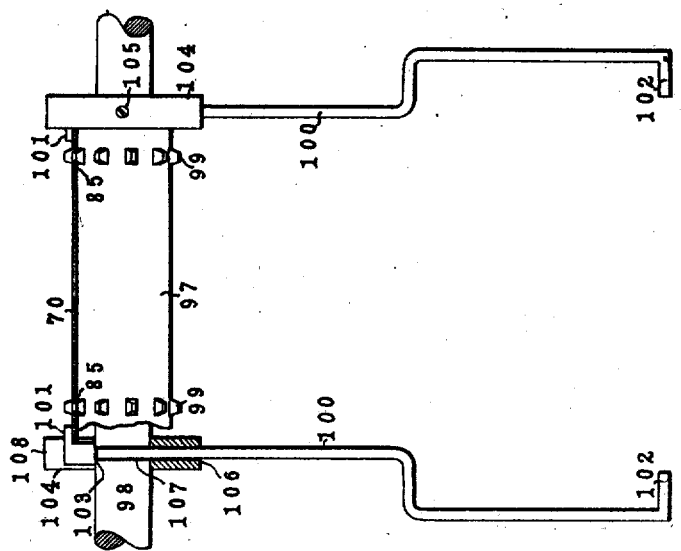
Fig. 6 is an end detail view, partly sectional, of another feature detector and associated parts appearing in Figs. 3 and 5.

Referring now more specifically to the drawings, the numeral 1 indicates the bed, or frame of the machine, which may be supported on a table or otherwise by the depending flanges 2. On one end of the bed is bolted a standard 3 in which is rotatively supported a horizontal strip-supply shaft 4 to which the strip-supply reel 5 is removably attached to rotate with the shaft 4. The reel 5 carries the strip to be tested which strip, as will be understood, will usually lie on the reel in coiled condition. Co-operative with the shaft 4 is a brake for arresting rotation of the shaft and, in consequence, rotation of the reel 5 and delivery of strip. This brake may include a brake shoe 6 adjustably threaded on the upper end of a vertically movable rod 7 guided in the standard 3, one end of the rod 7 extending to position beneath the frame 1 where it is articulated with a rod, or lever 8 adapted to fulcrum on the bracket 9. The brake rod 8 may be provided with an adjustable weight 10. The shoe 6 cooperates with a brake-drum 11, on the shaft 4. The numeral 12 indicates a housing enclosing the shoe 6 and the drum 11, the shaft 4 projecting from this housing.

At the opposite end of the bed 1 is the standard 20 supporting a housing 21 which in turn supports shaft 22 projecting from the housing. On the shaft 22 is removably mounted the strip take-up reel 23, the reel being sleeved on the shaft 22 so as to rotate therewith. The numeral 24 indicates a motor which, in the present embodiment, serves as the driving device for the strip feeding mechanism and for the take-up reel 23. The driving connections from the motor 24 to the take-up reel include a spur gear 25 on the motor shaft meshing with a pinion 26 on a horizontal shaft 27, which shaft enters the housing 21 and is provided with a worm 28, rotatable therewith. The numeral 29 indicates a stud supported by the housing 21, and the numeral 30 indicates a worm wheel rotatably mounted on the stud 29 and having a thrust bearing raceway 32 adapted to co-operate with ball bearings 33, the companion raceway for the balls being indicated at 34. One face 35 of the worm wheel 30 is adapted to serve as an element of a friction clutch, the cooperative clutch element including a circular member, or collar 36, rotatively bearing on the stud 29, the shaft 22 having a yoke portion 37 fastened to the clutch element 36. The reduced portion 38 of the stud 29 is encircled by a coiled spring 39, one end of which bears against the collar 36 and the other end against a head 40 of the stud. From this construction it will be perceived that the take-up shaft 22 is driven from the motor 24 through the instrumentality of the friction clutch element, so that, if conditions require, the shaft 22 may yield to the pull of the strip being tested so as not to rotate at a uniform speed.

The strip feeding mechanism includes a pair of feed rolls indicated by the numerals 50 and 51 (Fig. 7), these rolls being rotatively supported in frame standards 52 and 53 bolted to the bed 1, one of these standards supporting a housing 54 for enclosing some of the driving devices for the feed rolls. The feed rolls 50 and 51 are yieldingly pressed toward each other by spring 55, co-operating with bearing block 56 supporting the shaft 57 of the upper feed roll 50, as illustrated at the left in Fig. 7, this construction being duplicated at the right hand side. The shaft of the lower feed roll 51 is indicated at 58, and the two feed roll shafts are geared together through the intermeshing pinions 59 and 60, the shaft of the lower roll being extended and having a spiral gear 61 cooperating with a spiral gear 62 on the shaft 27 hereinbefore referred to, this latter shaft extending into the housing 54 as indicated in Fig. 2. The pressure between the feed rolls may be relaxed and the rolls separated when desired by manipulation of the arm or handle 63 attached to the lifting arms 64 which latter may take under the shaft 57 so as to lift the shaft. The arms 64 extend from a rock member 65 journaled in the standards 52 and 53, the handle 63 being connected to said rock member.

The strip of "film" to be tested is indicated by the numeral 70 and is shown in cross-section in Fig. 7. It will be seen that the upper feed roll 50 is counter-sunk, or recessed at 71 to avoid contact with the predetermined portion of the width of the strip which receives the pictures. The roll 50 is also provided with shoulders 72 to guide the strip as it is fed. The lower roll 51 is preferably cylindrical throughout its length so as to effectively support the full width of the strip. From the foregoing it will be perceived that as the motor 24 operates the connections from the same to the feed mechanism drive the feed rolls.

The numerals 75 and 76 indicate a pair of guiding and tensioning rolls between which the strip is led on its passage through the machine. These rolls are disposed in front of the feature detectors more specifically hereinafter referred to, and in a lower plane. The rolls 75 and 76 are generally similar in construction to the feed rolls hereinbefore referred to, the upper roll 75 being counter-sunk at 77 and having guiding shoulders 78, the two rolls being intergeared as by gears at 79 and 80 and being spring pressed toward each other by springs 81 one of which appears in Fig. 3. The guiding and tensioning rolls, however, in the present embodiment, rotate by contact of the moving strip therewith, being unprovided with any positive driving devices. The shaft 82 of the lower roll 76 is provided with a hand wheel 83 by which the two intergeared rolls may be rotated when desired.

A portion of a moving picture strip is illustrated in Fig. 11, such strip being provided with a series of normally spaced feed openings 85 adapted to co-operate with the driving sprockets of a moving picture apparatus, either when the pictures are taken or when they are projected. In the exigencies of manufacture of the strip, as well as in the operations of taking and projecting pictures, various defects in the strip may appear. For instance, one of the apertures 85 may be abnormally large; two or three adjacent apertures 85 may appear as a single opening of abnormal size; a slit, as 86, may appear between two or more adjacent openings 85, or a slit may appear in the edge of the strip as indicated at 87 and such a slit may communicate with one of the normal apertures 85 as indicated at 88. Each and all of these various abnormalities may be regarded as defects in the strip. Also it is oftentimes found desirable to sever the strip and reassemble the sections either in the same or different order. Due to carelessness in reassembly the proper operative continuity of the strip may not be preserved. Reassembly may be effected by lapping the ends of the strip sections and causing the lapped ends to adhere by suitable, usually transparent, adhesive as collodion. In Fig. 11 an underlying lapping strip section is indicated at 89, the overlapping end of this strip being indicated by the dotted line 90. Should the lapped arrangement be such as to completely or partly cover up one of the normal feed openings 85, or should the normal opening 85 be absent so that the strip material is continuous where the opening should appear, the sprocket or other pertinent mechanism of the taking or projecting machine would not properly co-operate with the openings 85. On the contrary, strip material 66 will appear and cover an opening 85 which should be open, and the consequent feed of the strip may be rendered inefficient and improper. It will be apparent from the above that the possible defects in the strip are many and varied in character. One of the main objects of the present invention is the detection of abnormal holes, slits and the like and the presence of abnormal material as just referred to.

One form of feature detector, more especially adapted for detecting apertures, holes, slits and the like is illustrated in section in Figs. 4 and 19. The numeral 91 indicates a strip support, shown as rotatable and cylindrical. This support is rotatably mounted in the standards 52 and 53 and in the form illustrated, is a roller. The numeral 92 indicates an aperture detector being, in the present embodiment, a detector pin which resiliently yields to the pressure of the passing strip, but which performs a detecting co-operation with the strip upon registry with a defect such as a hole, slit or the like, hereinbefore referred to. In the embodiment referred to, two of the pins 92 are employed, one for each margin of the strip. The pins 92 are spring pressed toward the normal plane of feed of the strip and transversely thereof by the springs 93 lying in openings in the support 91, the opening referred to being generally radial and entered at one end by screw plugs 94 apertured for the passage of trip rods 138, hereinafter more specifically referred to. The springs 93 are adapted to cause the detector pins 92 to project from the support 91, the pins being provided with shoulders 95 co-operative with the support 91 to limit the extent of projection of the pin. Under pressure of a normal strip, the pins 92 may be held within the roller support 91. The end of the detector over which the strip rides inclines toward the surface of the strip in the direction of feed, as indicated at 96, when in detecting position, so that the detector pin, in the present embodiment, when in detecting position at right angles to plane of the strip, as illustrated in Fig. 1, does not present an abrupt shoulder or abutment, against the movement of the strip. When the feature detector pin 92 is in alignment with the path of feed of normal apertures in the strip, as for instance, the apertures 85, the dimension of the feature detector in the line of feed should of course comport with the dimensions of the normal feed openings 85 in the strip so as to permit the passage of these normal openings without permitting the pin 92 to detectingly co-operate with the strip. In the present embodiment the dimension in the direction of feed of the strip should exceed the dimension of a normal opening 85, in the same direction, so that the normal openings readily slip past the pin. Should a slit, as 86, be present, the material of the strip may yield sufficiently to permit projection of the pin 92 sufficiently to make detecting co-operation. It is of course to be understood that additional aperture detectors may be applied in positions to detect such defects as the slits 87 or 88 in the edge of the strip, the pertinent dimension of the pin then in question being determined by the requirements of the defect to be detected.

Figure 5:
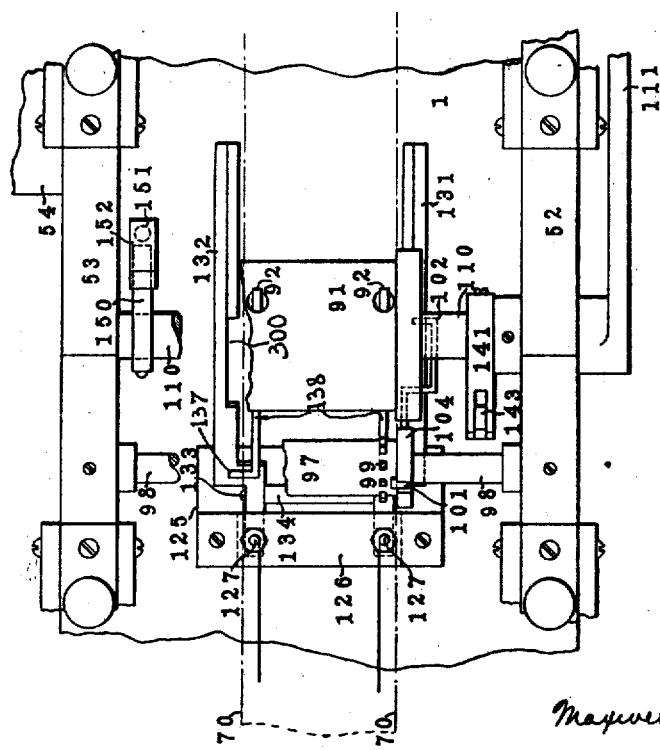
Fig. 5 is a plan view of certain of the parts of Fig. 3; certain parts being broken away for clearer disclosure.

The feature detector for detecting the absence of the normal openings, as 85, and the presence of abnormal strip material is clearly shown in Figs. 5 and 6. The numeral 97 indicates a strip support, shown as a freely rotatable cylindrical member rotatable on a stationary cross bearing 98 supported by the standards 52 and 53. One, or a series of feature detectors, as the strip feelers, or feeler pins, 99 radially project from the support 97, being circumferentially spaced thereon. As illustrated, the feeler pins 99 appear at each side of the support 97. The description will be directed to one side, but is to be understood as applying to both sides. The numeral 100 indicates a strip feeding controller member, trip, or rod, having a strip feeler portion, part, or lug 101 in superposed relation to the strip, and also having a tripping lug 102. As illustrated, the rod 100 is loosely supported for movement in a stationary path transversely of the axis of the support 97, and in a more or less vertical plane, so that its downward, or gravitative, movement causes the feeler lug 101 to approach the strip, the extent of this motion being limited by the shoulder 103, which arrests the movement when the lug 101 is a short distance from the plane of the strip. At 104 is a stationary block, or guide member, in which the rod 100 is freely slidable while performing its movements. The cross bearing 98 passes through the blocks 104, the latter being pinned to the bearing 98 by the set screw 105. The rods 100 enter guide openings 106 in the blocks 104 and pass upwardly through passages 107 in the bearing 98, the heads, or lugs 101 lying in slots 108 in the blocks 104. As will be seen, the blocks 104 serve to guide the strip in its passage over the rotatable support 97, and to hold said support and the pins carried thereby from lateral displacement so that the feed openings 85 will register with the feeler pins 99.

In operation, the strip advances under the pull of the feed rolls 50 and 51, and the engagement of the feeler pins 99 by the feed openings 85 in the strip, effects rotation of the strip support 97. The pins 99 accordingly are moved in an endless circular path which intersects the normal path of the strip as it lies on the support 97, succeeding feeler pins 99 being thus brought into and out of engagement with succeeding normal openings 85. Should a normal opening be absent, or covered by strip material in consequence of lapping or "patching" as heretofore explained, the end of the appropriate feeler pin 99 will make detecting co-operation with the strip by contacting with the abnormally disposed strip material filling the place of such opening, with the result that the strip will be displaced from its normal path, in the present instance, lifted. The displaced strip will contact the feeler lug 101 of the controller rod 100, and will actuate this rod, in the present instance lifting this rod together with its tripping lug 102. This actuation of rod 100 will result in modifying the feed movement of the strip, and it will be perceived that this actuation is responsive to detecting co-operation of the feelers 99 with the strip. After the actuating feeler pin 99 has moved sufficiently in the direction of feed of the strip, it will leave its position of detecting co-operation with the strip, thus permitting the strip to return to its normal path, and the lug 101 to gravitate to its original position adjacent, but slightly spaced from the strip.

The strip support 91 with which the aperture detector 92 is associated, as before explained, is carried by and rotates with the shaft 110, and to one end of this shaft is attached a device as the handle or crank 111, providing for convenient manual rotation of the strip support 91, and in consequence, manual rotative translation of the aperture detector 92. It will be perceived that by the construction described, the detecting pins 92 are mounted for reciprocation as well as oscillation in a rotary path.

One of the means or mechanisms, actuated by detecting co-operation of the feature detectors with the strip, for controlling the feed of the strip will now be described, reference being made more especially to Figs. 1 to 6 inclusive. The motor 24 is electric and, through the connections hereinbefore described, drives not only the strip feeding mechanism, but the strip take-up reel. The driving circuit for the motor includes the conductors 115 and 116, Fig. 3, a motor controlling means being provided to vary the operation of the motor. In the present embodiment the motor controlling means is indicated diagrammatically at 117 and includes a switch, or switch arm, 118 which, in the position illustrated in Fig. 3, is open so that the motor 24 is cut off from the supply of energizing current. In the position of the switch illustrated in Fig. 1, the circuit is completed through the conductors 115 and 116 and the electric motor 24 is running.

The numeral 119 indicates a generator driven from the motor 24 through the instrumentality of a belt 120. The generator supplies current to an electro-magnetic device, in the present instance an electro-magnet 121, the conductors for the supply of current to the magnet being indicated at 122, 123 and 124, the electro-magnet being in series in the generator circuit. For controlling the circuit for the electro-magnet a current interrupting device is provided. As illustrated in Figs. 3 and 5 there is provided a standard 125 having a cross-piece 126 of insulating material. Adjustably penetrating the cross-piece 126 and terminating below the cross-piece are the contact pins 127, one being connected to the conductor 123 and the other to the conductor 124. The circuit of the electro-magnet is made and broken by a current controlling member, including the two arms or fingers 131 and 132 pivoted at 133 on a standard 134 for simultaneous movement, the adjacent ends of these arms on one side of the pivot carrying a conducting plate 135 adapted simultaneously to make and to break contact with the lower ends of the two contact pins 127. The arms 131 and 132 are made of insulating material and, on the right hand side as viewed in Fig. 3, these arms over-balance the weight of the parts on the other side of the pivot 133, so that the tendency of the contact plate 135 is automatically to make contact with the pins 127. When the testing instrument is set to test the strip, the lug 102 of the trip rod 100, and the lug or trip 137 of the tail or trip rod 138 of the aperture detecting pin 92 (Fig. 4), underlie the arms 131 at the right hand side of the pivot 133, as illustrated in Fig. 1, the trip lugs 102 and 137 extending at angles to their rods 100 and 138 so as to be immediately available for lifting the arms 131 to break contact between the plate 135 and the pins 127 and thereby cut out the supply of current to the electro-magnet 121, the trip 137 being moved by the spring 93 synchronously with the detecting pin 92. This current interrupting device is very delicate in operation as the trip 137 is an integral part of the detector pin and responds readily without appreciable lost motion to the detecting cooperation referred to.

The numeral 140 indicates an armature for the electro-magnet, this armature being connected to an arm or crank 141, rotative with the strip support 91 in which the aperture detector 92 is disposed. In the present embodiment the connection is effected through the instrumentality of the upstanding connecting rod 142 and the link 143, the rod 142 passing through openings in the bed 1 and the bottom member of the side standard 52, and having a shoulder 144. Encircling the connecting rod 142 is a coil spring 145, one end of which is adapted to bear against the shoulder 144 and the other end against the face 146 of the base of the standard 52. The disposition and arrangement of the spring 145 is such that when the aperture detector 92 is set in detecting position with the tail 138 disposed as in Fig. 1, the spring 145 will be placed under compression between the shoulder 144 and the face 146, and serve as a potentializer immediately available to move the aperture detector 92 in the direction of feed of the strip when such motion is permitted. In the present embodiment the aperture detector 92 is carried by the rotatable strip support 91, and the latter is held from movement, when the electro-magnet is energized, by its connections to the armature 140 which latter will then adhere to the magnet. When the current interrupting device 131 is actuated in response to detecting co-operation of either of the feature detectors with the strip, the circuit of the electro-magnet will be broken and permit the potentializer, or spring, 145, to immediately give the aperture detector 92 a rotative movement of translation with the strip so that, should the aperture detector have engaged a defect in the strip, the tendency to tear the strip by improper relative movement between the strip and the aperture detector will be avoided.

Upon detecting co-operation of the feature detectors or either of them with the strip, it is desirable to arrest the feed of the strip, so as to give opportunity for the strip to be examined and repaired and to, as far as possible, avoid winding the defective portion onto the take-up reel. It is further desirable to arrest the strip in such a manner as not to magnify any of its defects. To these ends, detecting co-operation of the feature detectors is adapted to actuate the motor controlling means 117 and de-energize the electric motor circuit, thus causing arrest of operation of the feed mechanism and of the take-up reel. The numeral 150 (Figs. 3 and 5) indicates an arm rotative with the strip support 91 and the numeral 151 indicates a rod having spaced jaws 152 and 153, the arm 150 being adapted to lift the rod 151 and hold it in elevated position when the aperture detector is set in position to test the strip. The lower end of the rod 151 is operatively connected to the motor controlling device 117 through the switch member 118 and the jaws 154 and 155 on the rod 151. The rod 151 is also operatively connected to the brake rod 8 (see Fig. 1). When the parts are in detecting position, as illustrated in Fig. 1, the rod 151 is upheld by the arm 150, in which position the switch 118 closes the circuit leading to the motor 24. Also the brake shoe 6 is out of contact with the brake drum 11 of the take-up device. Upon detecting co-operation of either of the feature detectors with the strip, contact will be broken between the pins 127 and the contact plate 135; the electro-magnet 121 will be de-energized; the potentializer 145 will rotate the strip support 91 together with the aperture detector 92 in the direction of feed of the strip and the rod 151 may not only be urged downwardly, due to its connection through the support 91 with the spring 145, but said rod 151 will also gravitate downwardly. The result of the descent of the rod 151 will be to throw the switch 118 so as to cut out the electric motor from the supply of energizing current and also to apply the brake shoe 6 to the brake drum 11 so as to retard or arrest supply of strip to the detecting instrumentalities. The deenergizing of the motor 24 will also result in cessation of operation of the feeding mechanism and the strip take-up device.

It will be noted that after detecting co-operation and the control of the various devices in consequence of such co-operation, the rods 100 will automatically move to position for a succeeding co-operation with the interruptor arms 131 and 132, whereas the aperture detector 92, together with the strip support 91 in which it is mounted, will have rotated in the general direction of feed of the strip so that the tail 138 of the aperture detector will have been displaced from imminent co-operative relation with the arms 131 and 132. The position of the tail of the aperture detector will be as then generally illustrated in Fig. 3. It will be further noted that the movement of the aperture detector in the direction of feed of the strip will release this detector from detecting co-operation with the strip, the aperture detector moving in a circular path and gradually withdrawing from the aperture defect in the strip.

By rotating the strip support 91 by means of the handle 111 in a direction reverse to that of the feed of the strip the instrument is immediately reset in position for a further test, the arms 131 and 132 having notches or ways 300 for the passage of the trip lugs 137 past these arms on rotation of the rods 138. Thus the single manually operative device, or handle 111, may be used to reset the feature detector to detecting position; to cut in the electric motor, with consequent energization of the electro-magnet, so that the armature will hold the aperture detector in detecting position; to set the potentializer, or spring 145, in potentialized condition and to release the brake of the strip supply device. Also the resetting results in energizing the feeding mechanism and starting the operation of the take-up device.

In Figs. 10, 14, 15, 16 and 17 some modifications of the device are illustrated. The aperture detector (Figs. 14 and 17) includes the two detector pins 160, the detecting ends of which are similar to those of the aperture detector pins 92. In Fig. 17, however, the tail 138 is omitted and the holes in which the pins 160 lie are closed by the screw plugs 161. In constructing an instrument in accordance with the showing in these figures the electro-magnetic device 121 of the other embodiment may be omitted. The means illustrated in Fig. 14 for holding the aperture detector in detecting position, consists of a pivotally mounted shaft 162 having a handle 163 and a dog 164, which latter co-operates with a tooth 165 of a radial arm 166, movable with the strip support 167, which latter is similar in general construction and operation to the strip support 91. Rotative with the shaft 162 are the fingers 168, the lower ends 169 of which lie close to the strip, and preferably directly opposite the aperture detectors 160. The fingers 168 are provided with extended portions 170, the lower ends 171 of which lie close to and directly opposite the point in the endless path of the feeler fingers 99 where the latter make detecting co-operation with the strip. In Fig. 14 the parts are illustrated in detecting position. When either the feeler fingers 99 or the aperture detector 160, as illustrated in Fig. 14, make detecting co-operation with the strip, the finger or fingers 168 will rotate on their pivotal axes so as to free the dog 164 from the tooth 165, thereupon the rod 151 will gravitate downwardly and actuate the motor controlling switch 118, to cut out the motor 24, at the same time actuating the brake rod 8 to apply the brake to the strip supply device. The position of the parts after detecting co-operation is illustrated in Fig. 15. The set screw 172 may be utilized to determine the detecting position of the fingers 168 and 170 relative to the strip. In the form just referred to it will be understood that the generator 119 and the electro-magnet 121 may be omitted. But it is also to be understood that the operative connections between the electric motor 24, and the feed mechanism and the take-up device, are as explained in connection with the embodiment previously described.

In Figs. 18 and 20 the specific arrangement of the controlling connections between the feature detectors and the motor is varied somewhat from that illustrated in the embodiments previously described. Referring to Fig. 18, the electro-magnet instead of being disposed beneath the bed 1, as illustrated in Fig. 3, is supported on a bracket 180 fastened to the upper part of the standard 52, the magnet being indicated at 181. The armature for the magnet in this position is indicated at 182 and is mounted directly upon an arm 183 on the shaft 110. Also in the arrangement illustrated in Fig. 18 the generator 119 of Fig. 3 is omitted and the electro-magnet connected to be thrown into and out of circuit with the electric mains 184 and 185 through a switch which may be located at 117 as before mentioned having the arm 118 for co-operation with the jaws 154 and 155 of the rod 151. The arm 118 will co-operate with the terminals of the mains 184 and 185 and also with the terminals of the conductors 186 and 187, so that when the arm 118 is in the position indicated in Fig. 18, the bipolar switch provided at 117 will be open so as to cut off current from the mains 184 and 185 through the conductors 186 and 187, which latter lead to the motor indicated diagrammatically at 188, it being understood that the motor 188 is operatively connected with the feed rolls and with the take-up reel in the manner hereinbefore explained. The conductor 187 leads to one brush 189 of the motor and from the other brush 190 a conductor 191 leads to the electro-magnet 181, a conductor 192 leading from the electro-magnet to one of the contact pins 127, as explained in connection with the previous embodiment, another conductor 193 leading from the other contact pin 127 to a resistance coil 194 in series with the conductors 186 and 187. More or less resistance may be thrown in by moving the contact point 195 over the resistance coil 194 as will be understood. When the handle 111 is elevated from the position shown in Fig. 18 the armature 182 will be be moved to the electro-magnet 181; the arm 118 will be elevated and establish the current from the mains 184 and 185 to the conductors 186 and 187. Thus the motor 188 will be energized to drive the feeding mechanism and the take-up reel and also sufficient current will pass through the circuit of the electro-magnet to energize the latter and attract the armature so as to hold the aperture detector in detecting position as hereinbefore described. Upon detecting co-operation of either of the feature detectors with the strip the current interrupting device will be actuated, the electro-magnet will be de-energized and the strip support 91 permitted to rotate in the direction of feed of the strip carrying with it the aperture detectors. The rod 151 will therefore descend and throw out the switch at 117 so as to de-energize the motor 188 and cut off the electro-magnet from its source of current. The potentializing spring in Fig. 18 is indicated in dotted lines at 197 being fastened at one end to a pin or arm 198 on the shaft 110 and at the other end to the frame or to the bracket 180. Instead of permitting the guiding and tensioning rolls 75 and 76 to rotate idly under the influence of the strip being tested, they may be connected through the instrumentality of a driving belt 199 running over pulleys on the tension roller 76 and the feed roller 51, respectively. This driving connection tends to assure uniform feed of the strip to the position where the feature detectors are located.

The current interrupting device illustrated in Fig. 18 includes the terminal pins 127 before referred to which penetrate an insulating or fiber plate 200 (Fig. 20) supported on a block 201 on the frame. The numeral 202 indicates a horizontal shaft supported by a portion of the block 201, and serving as a pivot for two steel arms 203, 203, the left hand ends of which, viewed in Figs. 18 and 20 are adapted to move into and out of contact with the terminal pins 172. The right hand ends of the arms 203 carry insulating, or fiber shoes 204 with which the lugs or feet 102 and 137 of the strip material detectors and the aperture detectors are adapted to contact for actuating these arms to break the circuit. The numeral 205 indicates a conducting sleeve separating the two arms 203 and making contact therewith, the conducting circuit for the electro-magnet including the sleeve 205.

At the left hand end of Fig. 1 is indicated a roller 210 which may be used to wax the strip at the margins where the sprocket openings appear or which might be covered with felt to free the strip of dust, etc. The numeral 211 indicates a table disposed beneath the strip. When a defect appears the strip may be conveniently manipulated on this table and the defect corrected or the strip patched or otherwise repaired as may be desired.

The shafts 4 and 22 on which the supply reel and take-up reel are mounted are provided with convenient devices as the pivoted members 212 and 213; which may be thrown into position in line with the shafts to permit the reels to be applied and removed, but which, in the angular position illustrated in Fig. 1, serve to retain the reels on the shaft.

As will be perceived, each form of the instrument provides a very delicately responsive mechanism for detecting defects and for controlling the strip in consequence of detecting co-operation of the feature detectors therewith. There is very little chance for the strip to be injured in consequence of engagement by the feature detectors. Especially is this chance lessened in the case of the aperture detector. Not only do the potentializer springs or the gravitative rod, or both, potentialize the detector for immediate movement in the direction of feed of the strip upon detecting co-operation therewith, but the moving strip itself, as it passes over and in contact with the strip supports 91 and 97, tends to rotate these supports and thus assist in the movement of the detector with the trip. The potentializing spring and the potentializing rod 151, however, furnish a means, independent of the strip itself, for potentializing the movement of the aperture detector. The electromagnetic device 121 serves both as a means to hold the detector from movement with the strip, and also as a means for releasing the detector for movement with the strip. It will be seen that the potentializer springs and the rod 151 are, in effect, mechanical motors which serve to potentialize the aperture detector for movement and which are each automatically set in potentialized condition by resetting of the instrument as hereinbefore explained.

The defects in a moving picture strip are of many different kinds, and it is to be understood that the present invention contemplates the disposition of feature detectors at such points as to detectingly co-operate with defects other than hereinbefore mentioned. One, two, three or four or more detectors may be employed, either on the same or different margins of the strip as the exigencies of the case may require. Too great flexibility of a strip may be a defect under certain conditions, and the mechanisms hereinbefore described are adapted to respond to weakness of the strip and to cause arrest of the feed mechanism when the weak part of the strip registers with the feature detector 92, so as to permit detecting co-operation movement thereof.

Thus by the above described construction is accomplished among others the objects hereinbefore referred to.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described, and all statements of the scope of the invention which, as a matter of language, might be said to fall therebetween.

Having described my invention what I claim as new and desire to secure by Letters Patent is:

1. In a strip testing instrument, in combination, a feature detector adapted to move in the direction of feed of the strip, means adapted to hold said detector against such movement pending detecting co-operation with the strip and means adapted to release said detector from said holding means upon said detecting co-operation.

2. In a strip testing instrument, in combination, a feature detector adapted to move in the direction of feed of the strip, means whereby such movement releases the detector from detecting co-operation with the strip, and means adapted to hold said detector against such movement pending detecting co-operation with the strip.

3. In a strip testing instrument, in combination, a feature detector adapted to move in the direction of feed of the strip, means whereby such movement releases the detector from detecting co-operation with the strip, means adapted to hold said detector against such movement pending detecting co-operation with the strip, and means adapted to release said detector from said holding means upon said detecting co-operation.

4. In a strip testing instrument, in combination, strip feeding means, a feature detector adapted to move in the direction of feed of the strip, means adapted to potentialize said detector for such movement and means actuating said last-named means upon a feature being detected in said strip.

5. In a strip testing instrument, in combination, a feature detector adapted to move in the direction of feed of the strip, means adapted to potentialize said detector for such movement, means adapted to hold said detector against such movement pending detecting co-operation with the strip, and means adapted to release said detector from said holding means upon said detecting co-operation.

6. In a strip testing instrument, in combination, a feature detector adapted to move in the direction of feed of the strip, means adapted to potentialize said detector for such movement, means adapted to hold said detector against such movement pending detecting co-operation with the strip, means adapted to release said detector from said holding means upon said detecting co-operation, and means whereby such movement releases the detector from detecting co-operation with the strip.

7. In a strip testing instrument, in combination, a feature detector adapted to move in the direction of feed of the strip, means adapted to potentialize said detector for such movement, and means whereby such movement releases the detector from detecting co-operation with the strip.

8. In a strip testing instrument, in combination, a feature detector adapted to move in the direction of feed of the strip, means adapted to hold said detector against such movement pending detecting co-operation with the strip, means adapted to release said detector from said holding means upon said detecting co-operation, and means whereby resetting of said detector to detecting position is adapted to restore the hold of said holding means thereon.

9. In a strip testing instrument, in combination, strip feeding means, a feature detector adapted to move in the direction of the feed of the strip, means adapted to potentialize said detector for such movement, means adapted to hold said detector against such movement pending detecting cooperation with the strip, means whereby resetting of said detector to detecting position sets said potentializer in potentialized condition and means whereby a defect in said strip in its passage through said instrument will cause a release of said holding means.

10. In a strip testing instrument, in combination, a feature detector adapted to move in the direction of feed of the strip, means adapted to potentialize said detector for such movement, means adapted to hold said detector against such movement pending detecting co-operation with the strip, means adapted to release said detector from said holding means upon said detecting co-operation, and means whereby resetting of said detector to detecting position sets said potentializer in potentialized condition.

11. In a strip testing instrument, in combination, a feature detector adapted to move in the direction of feed of the strip, means adapted to potentialize said detector for such movement, means adapted to hold said detector against such movement pending detecting co-operation with the strip, means adapted to release said detector from said holding means upon said detecting co-operation, means whereby such movement releases the detector from detecting co-operation with the strip, and means whereby resetting of said detector to detecting position sets said potentializer in potentialized condition.

12. In a strip testing instrument, in combination, strip feeding means, a feature detector adapted to move in the direction of feed of the strip, means adapted to potentialize said detector for such movement, means adapted to hold said detector against such movement pending detecting cooperation with the strip, means whereby a defect in said strip in its passage through said instrument will cause a release of said holding means and thereby release the detector from detecting co-operation with the strip, and means whereby resetting of said detector to detecting position sets said potentializer in potentialized condition.

13. In a strip testing instrument, in combination, a feature detector adapted to move in the direction of feed of the strip, means adapted to hold said detector against such movement pending detecting co-operation with the strip, means adapted to release said detector from said holding means upon said detecting co-operation, means adapted to potentialize said detector for such movement, and means whereby resetting of said detector to detecting position restores hold of said holding means thereon and sets said potentializer in potentialized condition.

14. In a strip testing instrument, in combination, a feature detector adapted to move in the direction of feed of the strip, means adapted to hold said detector against said movement pending detecting co-operation with the strip, means whereby such movement releases the detector from detecting co-operation with the strip, means adapted to release said detector from said holding means upon said detecting co-operation, means adapted to potentialize said detector for such movement, and means whereby resetting of said detector to detecting position restores hold of said holding means thereon and sets said potentializer in potentialized condition.

15. In a strip testing instrument, in combination, a feature detector adapted to move in the direction of feed of the strip, means adapted to potentialize said detector for such movement, means adapted to hold said detector against such movement pending detecting co-operation with the strip, means adapted to release said detector from said holding means upon said detecting co-operation, and a single manually operative device to reset said feature detector to detecting position, restore hold of the holding means thereon and set said potentializer in potentialized condition.

16. In a strip testing instrument, in combination, a feature detector adapted, to co-operate with a strip and upon encountering a defect therein to move in the direction of feed of the strip, strip feeding mechanism, and means whereby resetting of said detector to detecting position is adapted to energize said feeding mechanism.

17. In a strip testing instrument, in combination, a feature detector adapted to move in the direction of feed of the strip, strip feeding mechanism, and means whereby resetting of said detector to detecting position is adapted to energize said feeding mechanism and hold said detector in detecting position.

18. In a strip testing instrument, in combination, a feature detector adapted to move in the direction of feed of the strip, strip feeding mechanism, and means whereby resetting of said detector to detecting position is adapted to energize said feeding mechanism, hold said detector in detecting position, and potentialize said detector for movement in the direction of feed of the strip.

19. In a strip testing instrument, in combination, a feature detector adapted to move in the direction of feed of the strip, means including an electro-magnetic device, adapted to hold said detector against such movement pending detecting co-operation with the strip, and means adapted to release said detector from said holding means upon said detecting co-operation.

20. In a strip testing instrument, in combination, a feature detector adapted to move in the direction of feed of the strip, means, including an electro-magnetic device, adapted to hold said detector against such movement pending detecting co-operation with the strip, and means, including a current interrupting device in the circuit of said electro-magnetic device, adapted to release said detector from said holding means upon said detecting co-operation.

21. In a strip testing instrument, in combination, a strip feeding means, a feature detector adapted to move in the direction of feed of the strip, means adapted to hold said detector against such movement pending detecting cooperation with the strip, means adapted to potentialize said detector for such movement, including an electro-magnetic device adapted to hold said potentializing means in potentialized condition and means whereby a defect in said strip in its passage through said instrument will effect a release of said holding means.

22. In a strip testing instrument, in combination, a feature detector adapted to move in the direction of feed of the strip, means adapted to hold said detector against such movement pending detecting co-operation with the strip, means adapted to release said detector from said holding means upon said detecting co-operation, and means adapted to potentialize said detector for such movement, including an electro-magnetic device adapted to hold said potentializing means in potentialized condition.

23. In a strip testing instrument, in combination, a feature detector adapted to move in the direction of feed of the strip, means adapted to hold said detector against such movement pending detecting co-operation with the strip, means adapted to release said detector from said holding means upon said detecting co-operation, and means adapted to potentialize said detector for such movement, including an electro-magnetic device adapted to hold said potentializing means in potentialized condition, said electro-magnetic device being an element of said detector holding means.

24. In a strip testing instrument, in combination, a feature detector adapted to move in the direction of feed of the strip, means adapted to hold said detector against such movement pending detecting co-operation with the strip, means adapted to release said detector from said holding means upon said detecting co-operation, and means adapted to potentialize said detector for such movement, including an electro-magnetic device adapted to hold said potentializing means in potentialized condition, said electro-magnetic device being an element of said detector holding means, said detector releasing means including a current interrupting device in the circuit of said electro-magnetic device.

25. In a strip testing instrument, in combination, a feature detector adapted to move in the direction of feed of the strip, means, including an electro-magnetic device, adapted to hold said detector against such movement pending detecting co-operation with the strip, means adapted to release said detector from said holding means upon said detecting co-operation, and means whereby resetting of said detector to detecting position is adapted to cause said electro-magnetic device to hold said detector from said movement.

26. In a strip testing instrument, in combination, a feature detector adapted to move in the direction of feed of the strip, means, including an electro-magnetic device, adapted to hold said detector against such movement pending detecting co-operation with the strip, means, including a current interrupting device in the circuit of said electro-magnetic device, adapted to release said detector from said holding means upon said detecting co-operation, and means whereby resetting of said detector to detecting position is adapted to actuate said current interrupting device and said electro-magnetic device to complete the circuit through the latter.

27. In a strip testing instrument, in combination, a feature detector adapted to move in the direction of feed of the strip, means, including an electro-magnetic device, adapted to hold said detector against such movement pending detecting co-operation with the strip, and means, including a current interrupting device in the circuit of said electro-magnetic device, adapted to release said detector from said holding means upon said detecting co-operation, and a detector potentializing device adapted to be held in potentialized condition by said electro-magnetic device and to be operative upon the release of said holding means.

28. In a strip testing instrument, in combination, a feature detector including one or more strip feelers movable into and out of predetermined openings in a passing strip and, in the absence of such openings, adapted to contact with the strip material filling the place of such opening, to thereby produce detecting co-operation with the strip, and a strip feeding controller member adapted to be actuated in response to said detecting co-operation.

29. In a strip testing instrument, in combination, a feature detector including one or more strip feelers movable into and out of predetermined openings in a passing strip and, in the absence of such openings, adapted to contact with the strip material filling the place of such opening, to thereby produce detecting co-operation with the strip, and a strip feeding controller member adapted to be actuated in response to said detecting co-operation, including a strip feeler portion superposed relative to the strip.

30. In a strip testing instrument, in combination, a feature detector including a series of strip feelers movable in an endless path intersecting the normal path of a passing strip, and a strip feeding controller member including a strip feeler portion adapted to be actuated by displacement of said strip from its normal path by one of said detector strip feelers.

31. In a strip testing instrument, in combination, a feature detector including one or more strip feelers movable into and out of predetermined openings in a passing strip and, in the absence of such openings, adapted to contact with the strip material filling the place of such opening, to thereby produce detecting co-operation with the strip and a strip feeding controller member including a part adapted to be actuated by displacement of the strip from its normal path by said feature detector.

32. In a strip testing instrument, in combination, a feature detector including one or more strip feelers movable into and out of predetermined openings in a passing strip and, in the absence of such openings, adapted to contact with the strip material filling the place of such openings, to thereby produce detecting co-operation with the strip, and a strip feeding controller member including a part adapted to be actuated by displacement of the strip from its normal path by said feature detector, said part being adapted to move toward the plane of the strip after said actuation.

33. In a strip testing instrument, in combination, a feature detector including one or more strip feelers movable into and out of predetermined openings in a passing strip and, in the absence of such openings, adapted to contact with the strip material filling the place of such openings, to thereby produce detecting co-operation with the strip, and a strip feeding controller member including a part adapted to be actuated by displacement of the strip from its normal path by said feature detector, said part being adapted to move toward the plane of the strip after said actuation, and means adapted to arrest said movement of said part, to position said part a short distance from the passing strip.

34. In a strip testing instrument, in combination, a rotatable strip support including a series of radially projecting circumferentially spaced strip feeler pins, and a strip feeler rod movable in a stationary path transversely of the axis of said support upon displacement of the strip to be tested by one of said pins.

35. In a strip testing instrument, in combination, a rotatable strip support including a series of radially projecting circumferentially spaced strip feeler pins, a rod having a strip feeler movable transversely of the path of the strip upon displacement of the strip to be tested by one of said pins and a stationary guide for said rod.

36. In a strip testing instrument, in combination, a rotatable strip support including a series of radially projecting circumferentially spaced strip feeler pins, a rod having a strip feeler movable transversely of the path of the strip, and a stationary guide for said rod, said rod being adapted to gravitatively move in said guide to cause said strip feeler to approach the plane of the strip.

37. In a strip testing instrument, in combination, a rotatable strip support including a series of radially projecting circumferentially spaced strip feeler pins, a rod having a strip feeler movable transversely of the path of the strip, a stationary guide for said rod, said rod being adapted to gravitatively move in said guide to cause said strip feeler to approach the plane of the strip, strip feeding mechanism, and means whereby actuation of said rod by said strip arrests actuation of said strip feeding mechanism.

38. In a strip testing instrument, in combination, a feature detector, strip feeding mechanism including a pair of feed rolls adapted to frictionally grip and feed the strip and positioned to one side of said detector and means, actuated upon the detector encountering a defect in said strip, adapted to discontinue the operation of said rolls.

39. In a strip testing instrument, in combination, a feature detector, strip feeding mechanism, a driving device for said feed mechanism, a controller for said driving device, electrically controlled means for actuating said controller including a member pivotally movable to make and break the circuit of said electrically controlled means, said member adapted to gravitatively move to make the circuit, and means including a trip, adapted to be operated by detecting co-operation of said detector with said strip, for moving said member to break the circuit.

40. In a strip testing instrument, in combination, a feature detector, strip feeding mechanism, means, actuated by detecting co-operation of said detector with said strip, adapted to control said feeding mechanism, a strip take-up reel, a motor, and driving connections from said motor to said take-up reel including a friction clutch.

41. In a strip testing instrument, in combination, a feature detector, a strip feeding mechanism, means, actuated by detecting co-operation of said detector with said strip, adapted to control said feeding mechanism, a strip take-up reel, a motor, driving connections from said motor to said take-up reel including a friction clutch, and driving connections between said motor and said feeding mechanism.

42. In a strip testing instrument, in combination, a feature detector, strip feeding mechanism, a controller for said mechanism, a mechanical motor, operatively connected to said controller, means adapted to hold said mechanical motor in potentialized condition, and means, actuated by detecting co-operation of said feature detector with said strip, adapted to release said holding means to permit said mechanical motor to actuate said controller.

43. In a strip testing instrument, in combination, a feature detector, strip feeding mechanism, an electric motor adapted to actuate said feeding mechanism, an electric motor controlling means, a mechanical motor, operatively connected to said controlling means, means adapted to hold said mechanical motor in potentialized condition, and means, actuated by detecting co-operation of said feature detector with said strip, adapted to release said holding means to permit said mechanical motor to actuate said controlling means.

44. In a strip testing instrument, in combination, a feature detector, strip feeding mechanism, an electric motor adapted to actuate said feeding mechanism, an electric motor controlling means, a mechanical motor, operatively connected to said controlling means, means, including an electro-magnet, adapted to hold said mechanical motor in potentialized condition, and a current interrupter, for the circuit of said electro-magnet, adapted to be actuated on detecting co-operation of said detector with said strip.

45. In a strip testing instrument, in combination, a feature detector, strip feeding mechanism, an electric motor adapted to actuate said feeding mechanism, an electric motor controlling means, a mechanical motor, operatively connected to said controlling means, means, including an electro-magnet, adapted to hold said mechanical motor in potentialized condition, a current interrupter, for the circuit of said electro-magnet, adapted to be actuated on detecting co-operation of said detector with said strip, and a generator, for the circuit of said electro-magnet, driven by said electric motor.

46. In a strip testing instrument, in combination, a feature detector, strip feeding mechanism, a controller for said mechanism, a mechanical motor, operatively connected to said controller, means adapted to hold said mechanical motor in potentialized condition, and means, actuated by detecting co-operation of said feature detector with said strip, adapted to release said holding means to permit said mechanical motor to actuate said controller, said feature detector being adapted to move in the direction of feed of the strip upon detecting co-operation therewith.

47. In a strip testing instrument, in combination, a feature detector, strip feeding mechanism, an electric motor adapted to actuate said feeding mechanism, an electric motor controlling means, a mechanical motor, operatively connected to said controlling means, means adapted to hold said mechanical motor in potentialized condition, and means, actuated by detecting co-operation of said feature detector with said strip, adapted to release said holding means to permit said mechanical motor to actuate said controlling means, said feature detector being adapted to move in the direction of feed of the strip upon detecting co-operation therewith.

48. In a strip testing instrument, in combination, a feature detector, strip feeding mechanism, an electric motor adapted to actuate said feeding mechanism, an electric motor controlling means, a mechanical motor, operatively connected to said controlling means, means, including an electro-magnet, adapted to hold said mechanical motor in potentialized condition, and a current interrupter, for the circuit of said electro-magnet, adapted to be actuated on detecting co-operation of said detector with said strip, said feature detector being adapted to move in the direction of feed of the strip upon detecting co-operation therewith.

49. In a strip testing instrument, in combination, a feature detector, strip feeding mechanism, a controller for said mechanism, a mechanical motor, operatively connected to said controller, means adapted to hold said mechanical motor in potentialized condition, and means, actuated by detecting co-operation of said feature detector with said strip, adapted to release said holding means to permit said mechanical motor to actuate said controller, said feature detector being adapted to move in the direction of feed of the strip upon detecting co-operation therewith, and means whereby said mechanical motor is adapted to move said feature detector in the direction of feed of the strip.

50. In a strip testing instrument, in combination, a feature detector, strip feeding mechanism, an electric motor adapted to actuate said feeding mechanism, an electric motor controlling means, a mechanical motor, operatively connected to said controlling means, means adapted to hold said mechanical motor in potentialized condition, means, actuated by detecting co-operation of said feature detector with said strip, adapted to release said holding means to permit said mechanical motor to actuate said controlling means, said feature detector being adapted to move in the direction of feed of the strip upon detecting co-operation therewith, and means controlled by said electro-magnet adapted to permit of and to prevent said feature detector from so moving.

51. In a strip testing instrument, in combination, a feature detector, strip feeding mechanism, a controller for said mechanism, a mechanical motor, operatively connected to said controller, means adapted to hold said mechanical motor in potentialized condition, means, actuated by detecting co-operation of said feature detector with said strip, adapted to release said holding means to permit said mechanical motor to actuate said controller, said feature detector being adapted to move in the direction of feed of the strip upon detecting co-operation therewith, means whereby said mechanical motor is adapted to move said feature detector in the direction of feed of the strip, and means controlled by said electro-magnet adapted to permit of and to prevent said feature detector from so moving.

52. In a strip testing instrument, in combination, a feature detector, strip feeding mechanism, a controller for said mechanism, a mechanical motor, operatively connected to said controller, means adapted to hold said mechanical motor in potentialized condition, means, actuated by detecting co-operation of said feature detector with said strip, adapted to release said holding means to permit said mechanical motor to actuate said controller, said feature detector being adapted to move in the direction of feed of the strip upon detecting co-operation therewith, means whereby said mechanical motor is adapted to move said feature detector in the direction of feed of the strip, means controlled by said electro-magnet adapted to permit of and to prevent said feature detector from so moving, and a generator, for the circuit of said electro-magnet, driven by said electric motor.

53. A feature detector adapted to resiliently yield to the pressure of a passing strip, the end of said detector over which the strip rides inclining toward the surface of the strip in the direction of feed of the strip when in detecting position.

54. In combination, a feature detector adapted to resiliently yield to the pressure of a passing strip, the end of said detector over which the strip rides inclining toward the surface of the strip in the direction of feed of the strip when in detecting position, and means adapted to free said detector for movement in the direction of feed of the strip upon detecting co-operation thereof with the strip.

55. In a strip testing instrument, in combination, a feature detector, means adapted to feed the strip past said detector, means whereby detecting co-operation of said detector with the strip is adapted to control movement of the strip by said feed means, a strip support by which said detector is carried and with which it is movable, and means adapted to hold said strip support from movement pending said detecting co-operation and permit it to move upon said detecting co-operation.

56. In a strip testing instrument, in combination, a feature detector, means adapted to feed the strip past said detector, means whereby detecting co-operation of said detector with the strip is adapted to control movement of the strip by said feed means, a rotatable strip support with which said detector moves and above the supporting surface of which it is adapted to project, means adapted to prevent rotation of said support under the influence of the moving strip and means adapted to free said support for rotation by the strip upon said detecting cooperation.

57. In a strip testing instrument, in combination, a feature detector, means adapted to feed the strip past said detector, means whereby detecting co-operation of said detector with the strip is adapted to control movement of the strip by said feed means, a rotatable strip support with which said detector moves and above the supporting surface of which it is adapted to project, means adapted to prevent rotation of said support under the influence of the moving strip, means adapted to free said support for rotation by the strip upon said detecting cooperation, and means, independent of the strip, adapted to rotate said support when free.

58. In a strip testing instrument, in combination, a feature detector, means adapted to feed the strip past said detector, means whereby detecting co-operation of said detector with the strip is adapted to control movement of the strip by said feed means, a rotatable strip support with which said detector moves and above the supporting surface of which it is adapted to project, means adapted to prevent rotation of said support under the influence of the moving strip, means adapted to free said support for rotation by the strip upon said detecting cooperation, and means, independent of the strip, adapted to rotate said support when free, including a potentializer adapted to be set in potentialized condition by rotation of said support in a direction opposite to that effected by said strip.

59. In a strip testing instrument, in combination, a strip support adapted for rotation, a feature detector means adapted to hold said support from rotation in one direction, and means adapted to release said holding means to permit said support to rotate upon detecting cooperation of said feature detector with the strip to be tested.

60. In a strip testing instrument, in combination, a strip support adapted for rotation, means adapted to hold said support from rotation in one direction, means adapted to release said holding means to permit said support to rotate, a detector pin movable in said support transversely of the rotary axis, a spring for causing said pin to project from said support, and means for limiting the extent of projection of said pin.

61. In a strip testing instrument, in combination, a feature detector, a strip support adapted for rotation, means adapted to hold said support from rotation in one direction, means adapted to release said holding means to permit said support to rotate, a detector pin movable in said support transversely of the rotary axis, a spring for causing said pin to project from said support, and means for limiting the extent of projection of said pin, said pin having a tail oppositely projecting from said support.

62. In a strip testing instrument, in combination, a plurality of feature detectors adapted to detectingly co-operate with a passing strip, one to detect abnormal holes, slits, and the like, and another to detect abnormal material where holes should appear, strip feeding means, means whereby detecting co-operation of either of said detectors is adapted to control movement of the strip by said feeding means, one of said detectors including a series of radially projecting, circumferentially spaced, strip feeler pins, rotatable in an endless path intersecting the normal path of the strip, and another including a detector pin adapted to resiliently yield to the pressure of a passing strip, the detecting end of the latter inclining toward the surface of the strip in the direction of feed of the strip when in detecting position.

63. In a strip testing instrument, in combination, a plurality of feature detectors adapted to detectingly co-operate with a passing strip, one to detect abnormal holes, slits, and the like, and another to detect abnormal material where holes should appear, strip feeding mechanism, a device for controlling actuation of said mechanism, a potentializer adapted to actuate said controlling device and operative connections whereby said potentializer is permitted to actuate said controlling device on detecting co-operation of either of said detectors.

64. In a strip testing machine, in combination, a feature detector, a pair of strip feeding rolls, means whereby detecting co-operation of said detector with the strip is adapted to control movement of the strip by said feed rolls, one of said feed rolls having a counter-sunk peripheral portion to avoid contact with a predetermined portion of the width of the strip, a pair of guiding and tensioning rolls adapted to yieldingly grip the strip therebetween, the periphery of one of said last mentioned rolls being counter-sunk to avoid contact with a predetermined portion of the width of the strip, these last mentioned rolls being intergeared and adapted to be rotated by movement of the strip.

65. In a strip testing instrument, in combination, a rotatably mounted strip support, a pair of strip feeding rolls, a motor operatively connected to drive said rolls, a spring pressed feature detector rotatable with said strip support, a motor control device, means adapted to hold said strip support from rotation, operative connections between said strip support and said motor control device, and means whereby detecting co-operation of said feature detector with said strip frees said holding means and actuates said motor control device to arrest operation of said motor.

66. In a strip testing instrument, in combination, a rotatably mounted strip support, a pair of strip feeding rolls, a motor operatively connected to drive said rolls, a spring pressed feature detector rotatable with said strip support, a motor control device, means adapted to hold said strip support from rotation, operative connections between said strip support and said motor control device, means whereby detecting co-operation of said feature detector with said strip frees said holding means and actuates said motor control device to arrest operation of said motor, and a strip support potentializer held in potentialized condition by said holding means.

67. In a strip testing instrument, in combination, a rotatively translatable feature detector, a strip support adjacent thereto, a pair of strip feeding rolls, an electric motor for operating said rolls, a controller for the circuit of said electric motor, means adapted to hold said detector from translation with the strip, and means whereby detecting co-operation of said detector with said strip actuates said controller to cut out the motor and frees said feature detector from said holding means.

68. In a strip testing instrument, in combination, a rotatively translatable feature detector, a strip support adjacent thereto, a pair of strip feeding rolls, an electric motor for operating said rolls, a controller for the circuit of said electric motor, means adapted to hold said detector from translation with the strip, means whereby detecting co-operation of said detector with said strip actuates said controller to cut out the motor and frees said feature detector from said holding means, and means whereby reverse movement of said detector restores it to the hold of said holding means and actuates said controller to cut in said electric motor.

69. In a strip testing instrument, in combination, a rotatively translatable feature detector, a potentializer adapted to operate on said feature detector, a strip support adjacent thereto, a pair of strip feeding rolls, an electric motor for operating said rolls, a controller for the circuit of said electric motor, means adapted to hold said detector from translation with the strip, means whereby detecting co-operation of said detector with said strip actuates said controller to cut out the motor and frees said feature detector from said holding means, and means whereby reverse movement of said detector restores it to the hold of said holding means and actuates said controller to cut in said electric motor and sets said potentializer in potentialized condition.

70. In a strip testing instrument, in combination, a feature detector adapted to resiliently yield to the pressure of a passing strip, the end of said detector over which the strip rides inclining toward the surface of the strip in the direction of feed of the strip when in detecting position, means adapted to feed the strip past said detector, means whereby detecting co-operation of said detector with the strip is adapted to control the movement of the strip by said feed means, a rotatable strip support with which said detector moves and above the supporting surface of which it is adapted to project, means adapted to prevent rotation of said support under the influence of the moving strip and means adapted to free said support for rotation by the strip upon said detecting co-operation.

71. In a strip testing instrument, in combination, a feature detector adapted to resiliently yield to the pressure of a passing strip the end of said detector over which the strip rides inclining toward the surface of the strip in the direction of feed of the strip when in detecting position, means adapted to feed the strip past said detector, means whereby detecting co-operation of said detector with the strip is adapted to control the movement of the strip by said feed means, a rotatable strip support with which said detector moves and above the supporting surface of which it is adapted to project, means adapted to prevent rotation of said support under the influence of the moving strip, means adapted to free said support for rotation by the strip upon said detecting co-operation, and means, independent of the strip, adapted to rotate said support when free.

72. In a strip testing instrument, in combination, a feature detecting pin mounted for movement transversely of the direction of feed of the strip to be tested, a spring for effecting the transverse movement of said pin, strip feeding mechanism, a trip connected with and movable synchronously with said pin on the latter's said transverse movement, and a feed controlling member operatively connected with and actuated by movement of said trip by said spring upon detecting cooperation of said detecting pin with said strip.

73. In a strip testing instrument, in combination, a feature detecting pin mounted for movement transversely of the direction of feed of the strip to be tested, a spring for effecting the transverse movement of said pin, strip feeding mechanism, a trip connected with and movable synchronously with said pin on the latter's said transverse movement, a feed controlling member operatively connected with and actuated by movement of said trip by said spring upon detecting cooperation of said detecting pin with said strip, a second feature detector having radially projecting feeler pins circumferentially spaced to register with normally spaced feed openings of the moving strip, means adapted to hold said feeler pins from lateral displacement, and a rod having a lug adapted to be moved by interposition of abnormal strip material between said lug and said feeler pins, said rod having a trip for actuating said feed controlling member upon movement of said rod by such interposition of abnormal strip material.

74. In a strip testing instrument, in combination, a feature detecting pin mounted for movement transversely of the direction of feed of the strip to be tested, a spring for effecting the transverse movement of said pin, strip feeding mechanism, a trip connected with and movable synchronously with said pin on the latter's said transverse movement, an electric circuit, and means including an arm pivoted to move to make and break said circuit, said arm adapted to lie in the path of said trip and actuated by movement of said trip by said spring upon detecting cooperation of said detecting pin with said strip.

75. In a strip testing instrument, in combination, a feature detecting device including a trip rod mounted for longitudinal oscillation and oscillation in a rotary path, a feature detector adapted on detecting cooperation with the strip, to move said rod longitudinally, said rod having a trip extending at an angle thereto, strip feeding mechanism, and means for controlling said feeding mechanism including an electric circuit, and an arm pivoted to move to make and break said circuit, said arm lying in the path of said trip for actuation by said trip upon longitudinal movement of said rod in one direction, and having a way for the passage of said trip past said arm upon rotary movement of said rod.

76. In a strip testing instrument, in combination, a feature detecting device including a trip rod mounted for longitudinal oscillation and oscillation in a rotary path, a feature detector adapted, on detecting cooperation with the strip, to move said rod longitudinally, said rod having a trip extending at an angle thereto, strip feeding mechanism, means for controlling said feeding mechanism including an electric circuit, and an arm pivoted to move to make and break said circuit, said arm lying in the path of said trip for actuation by said trip upon longitudinal movement of said rod in one direction, and having a way for the passage of said trip past said arm upon rotary movement of said rod, the tendency of said arm being automatically to make said circuit.

77. In a strip testing instrument, in combination, a feature detector including a rotatable member having radially projecting strip feeler pins circumferentially spaced to enter the normally spaced feed openings of a passing strip, said member being adapted to hold said pins from lateral displacement, and a strip feeding controller having a part adapted to be actuated by interposition of abnormal strip material between said pins and said part.

78. In a strip testing instrument, in combination, a plurality of feature detectors adapted to detectingly cooperate with a passing strip, one to detect abnormal holes, slits, and the like, and another to detect abnormal material where holes should appear, strip feeding means, means whereby detecting cooperation of either of said detectors is adapted to control movement of the strip by said feeding means, one of said detectors including a series of radially projecting, circumferentially spaced, strip feeler pins, rotatable in an endless path intersecting the normal path of the strip, and another including a detector pin adapted to resiliently yield to the pressure of a passing strip.

79. In a strip testing machine, in combination, a feature detector, a pair of strip feeding rolls, means whereby detecting co-operation of said detector with the strip is adapted to control movement of the strip by said feed rolls, one of said feed rolls having a countersunk peripheral portion to avoid contact with a predetermined portion of the width of the strip, a pair of guiding and tensioning rolls adapted to yieldingly grip the strip therebetween, the periphery of one of said last mentioned rolls being countersunk to avoid contact with a predetermined portion of the width of the strip, these last mentioned rolls being intergeared, and a device for positively rotating said last mentioned rolls.

80. A strip testing instrument, including a supply reel, a take-up reel, means for rotating said take-up reel, a roller over which the film travels interposed between said reels, means adapted to arrest the rotation of said take-up reel, means co-acting with said roller for holding said arresting means in inoperative position, spring-pressed pins shiftably arranged in said roller and normally held by the film within said roller but permitted to project beyond said roller when a defective portion of the film travels over the same, and means operatively connecting said pins and holding means, said pins when projecting out of said roller rendering said holding means inoperative.

81. A strip testing instrument, including a supply reel, a take-up reel, an electric motor geared to said take-up reel, a roller over which the film travels interposed between said reels, a switch in the circuit of said motor, means co-acting with said roller holding said switch in closing position, and spring-pressed pins shiftably arranged in said roller normally held by the film within said roller and permitted to project beyond said roller when a defective portion of the film travels over the same, and means for rendering said holding means inoperative when said pins project out of said roller.

82. A strip testing instrument, including a supply reel, a take-up reel, means for rotating said take-up reel, a roller over which the film travels interposed between said reels, spring-pressed pins shiftably arranged in said roller and normally held by the film within said roller but permitted to project beyond said roller when a defective portion of the film travels over the same, and means actuated by said pins when projecting out of said roller for arresting the rotation of said take-up reel.

83. A strip testing instrument, including a supply reel, a take-up reel, an electric motor geared to said take-up reel, a roller over which the film travels interposed between said reels, spring-pressed pins shiftably arranged in said roller normally held by the film within said roller and permitted to project beyond said roller when a defective portion of the film travels over the same, a switch in the circuit of said motor, and means for operatively connecting said pins with said switch whereby the latter is adapted to be shifted to open position by said pins when the latter project out of said roller.

84. A strip testing instrument including a strip receiving means, an electric motor operatively connected to said receiving means, a member over which the strip travels in its passage towards said receiving means, strip contacting means carried by said member, a switch connected with said motor and also with said strip contacting means, said member being stationary when said switch is in its closed position and moving with the strip when said switch moves to its open position.

85. A strip testing instrument, including a roller, means for causing a film to travel over said roller, spring-pressed pins shiftably arranged in said roller and normally held by the film within said roller but permitted to project beyond said roller when an injured portion of the film travels over the same, and means actuated by said pins when projecting out of said roller for arresting the travel of the film.

86. A strip testing instrument including a normally stationary member over which a strip is adapted to pass, strip moving means, strip contacting means carried by and movable relative to said member, said contacting means being normally held immovable by virtue of the restraining influence exerted by said strip thereon and being adapted to move relative to said member when a defective portion of said strip moves to a position adjacent the same, means movably mounting said member, said member being adapted to move upon said strip contacting means moving relative to said member, and means connecting said member with said strip moving means whereby to cause a cessation of movement of said strip upon said member being moved.

87. A strip testing instrument, including a support, means for causing a film to travel over said support, spring-pressed means shiftably arranged in said support and normally held by the film within said support but permitted to project beyond said support when an injured portion of the film travels over the same, and means actuated by said spring pressed means when projecting out of said support for arresting the movement of the film.

88. A strip testing instrument, comprising a support, means for causing a film to travel over said support, and spring-pressed means shiftable on said support in a direction at right angles to the plane of the film and normally held by the latter within said support but permitted to project beyond said support when a defective portion of the film travels over the same.

In testimony whereof I affix my signature, in the presence of two witnesses.

MAXWELL VIDAVER.

Witnesses:
H. M. SEAMANS,
M. A. CASHIN.